United States Patent Office 3,441,431
Patented Apr. 29, 1969

3,441,431
ENHANCING THE REPELLENCY OF FIBROUS MATERIALS WITH FLUOROALKOXYALKYL SILANES OR SILOXANES
Allen G. Pittman, El Cerrito, and William L. Wasley, Berkeley, Calif., assignors to the United States of America as represented by the Secretary of Agriculture
No Drawing. Continuation-in-part of application Ser. No. 526,366, Feb. 10, 1966. This application May 25, 1967, Ser. No. 641,108
Int. Cl. D06m 15/66, 13/18
U.S. Cl. 117—121    16 Claims

ABSTRACT OF THE DISCLOSURE

A fluoroisopropyl allyl (or vinyl) ether, which contains a fluorine atom on the alpha carbon atom of the isopropyl group, is reacted with a silane containing H directly bonded to the Si atom whereby to achieve chemical addition. Typically, heptafluoroisopropyl allyl ether is reacted with methyldichlorosilane to produce

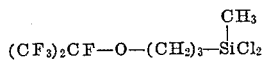
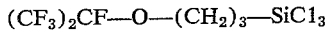

or with trichlorosilane to produce $$(CF_3)_2CF\text{---}O\text{---}(CH_2)_3\text{---}SiCl_3$$

The silane derivatives are useful, in both monomeric or polymeric form, for imparting a high degree of water- and oil-repellency to fibrous substances, e.g., fabrics made from natural or synthetic fibers. Typically, the monomeric silane derivative is subjected to hydrolytic polymerization and the resulting polysiloxane, dissolved in an inert solvent, is applied to a fabric. The treated fabric is then air-dried and cured in an oven—150° C. for about ½ hour.

---

This application is a continuation-in-part of our copending application Ser. No. 526,366, filed Feb. 10, 1966, now abandoned.

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of procedures for treating fibrous materials, especially textiles, with fluoroalkoxyalkyl silanes or the polymeric siloxanes derived therefrom. The objects of the invention also include the provision of the treated materials as new products. Further objects of the invention will be evident from the following description wherein parts and percentages are by weight unless otherwise specified.

The fluoroalkoxyalkyl silanes and siloxanes used as treating agents in the present invention are, respectively, the subjects of our copending applications filed Feb. 10, 1966, Ser. Nos. 526,348 and 526,378, the latter now Patent 3,331,813 granted July 18, 1967.

Various intermediates used in the preparation of the fluoroalkoxyalkyl silanes and siloxanes are, in turn, described in one or more of the copending applications listed in the following table. Specific reference to these applications will be made hereinbelow.

| Ser. No. | Filing date | Current status |
|---|---|---|
| 398,129 | Sept. 21, 1964 | Patent 3,384,628. |
| 433,818 | Feb. 18, 1965 | Patent 3,382,222. |
| 457,533 | May 20, 1965 | Pending. |

The fact that various organic siloxanes confer water-repellency on substrates is well known and, indeed, these compounds are used extensively to render ceramics, masonry, and fibrous materials water-repellent. In many instances, water-repellency alone is not sufficient; oil-repellency is also required. This is the case, for example, where the treatment is intended to confer resistance to soils and stains. Since these may involve oil-borne as well as water-borne soiling components, both types of repellency are essential. The known organo-siloxanes do not yield an effective level of oil-repellency and thus do not provide the desired protection from oil-borne soils. Many attempts have been made in the art to provide siloxane compositions which provide the requisite dual repellency but invariably these attempts have failed by reason of ineffectiveness of one form of repellency or the other or even virtual cancellation of both.

It is, therefore, a prime object of the invention to provide novel compounds which are useful to provide substrates with a high degree of both water- and oil-repellency.

THE NEW COMPOUNDS

The novel monomers of the invention have the structure:

(I) 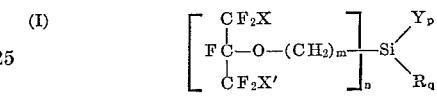

wherein:

X and X' are each a halogen,
Y is a member of the group consisting of halogen, alkoxy, and aroxy,
R is a member of the group consisting of hydrogen, monovalent hydrocarbon radicals, and monovalent halo-hydrocarbon radicals,
$m$ is an integer from 2 to 3,
$n$ is an integer from 1 to 2,
$p$ is an integer from 1 to 3,
$q$ is an integer from 0 to 2, and
the sum of $n$, $p$, and $q$ is 4.

Referring to the above formula, examples of values for the various symbols are given below by way of illustration and not limitation:

X and X' may be the same or different halogens, for example, fluorine, chlorine, bromine, or iodine.

Y may be a halogen such as fluorine, chlorine, bromine, or iodine; an alkoxy radical such as methoxy, ethoxy, isopropoxy, propoxy, butoxy, cyclohexyloxy, or the like; or an aroxy radical such as phenoxy, toloxy, ethylphenoxy, isopropylphenoxy, or the like.

Examples of R are hydrogen; an alkyl radical such as methyl, ethyl, propyl, isopropyl, butyl, cyclohexyl, methycyclohexyl, etc.; an aryl radical such as phenyl, tolyl, ethylphenyl, isopropylphenyl, xylyl, xenyl, naphthyl, etc.; an aralkyl radical such as benzyl or 2-phenylethyl; or a halogenated hydrocarbon radical such as 2-chloroethyl, trifluoromethyl, 3-chloropropyl, 2,2,2-trifluoroethyl, 4-chloro-(or fluoro-) cyclohexyl, p-chloro-(or bromo- or fluoro-) phenyl, and the like.

A particularly critical aspect of the compounds of the invention is the presence of the above-described perhalo-isopropyl radical, especially in the fact that it contains a fluorine group in alpha posioion (that is, on the secondary carbon atom). The unique structure of this radical provides the advantage that it confers a greater degree of oleophobicity for a given number of fluorinated carbon groups than with a straight-chain orrangement of —CF$_2$— groups. In fact, our investigations have shown that three fluorinated carbon atoms in our arrangement provide a degree of oleophobicity equivalent to 6 or 7 fluorinated carbons in a straight chain. Another important aspect of the invention is that the —O—(CH$_2$)$_m$— portion of the compounds provides effective isolation of the fluorinated isopropyl group from the silyl group. As a result, the compounds are stable and will undergo typical polymerization reactions, unaffected by the fluorine-containing "tail." Accordingly, the compounds can be converted into various polymeric derivations useful for a wide variety of uses, including the treatment of textiles and other fibrous materials.

Among the various compounds of the invention, we especially prefer those wherein both X and X' are fluorine. These compounds yield particularly good soil-repellent finishes on textiles. Also useful are those compounds wherein X is fluorine and X' is chlorine, or wherein both X and X' are chlorine.

Considering now the silyl portion of the compounds, Y represents a radical which confers reactivity, e.g., it enables the compounds to be polymerized and/or to chemically combine with substrates to which the compounds are applied. Particularly preferred for Y are chlorine or lower alkoxy such as methoxy or ethoxy. Moreover, it is preferred that the number of Y groups be two or three (i.e., that $p$ be 2 to 3) since such compounds are polymerizable. As to the radical R: When this radical is present (that is, when $q$ is 1 to 2) the preferred embodiments are hydrogen or a simple hydrocarbon radical such as methyl, ethyl, or phenyl.

Taking the above considerations into account, the compounds of the invention which are particularly preferred for use (in monomeric or polymeric form) in the treating of textiles and other fibrous substrates, are those of the types:

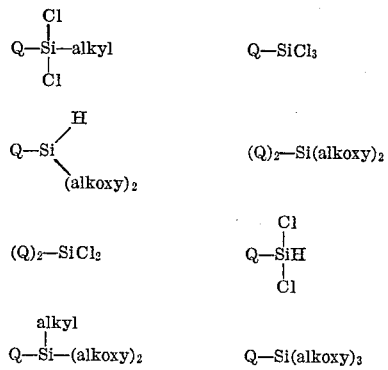

In the above formulas, Q stands for the radical

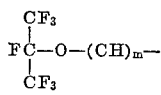

(wherein $m$ is 2 or 3)

PREPARATION OF THE NEW COMPOUNDS

In preparing the compounds of the invention, a fluoroisopropyl allyl (or vinyl) ether is reacted with a silane containing hydrogen directly bonded to the Si atom whereby to achieve a chemical addition. (The allyl or vinyl ethers used as the starting material may be prepared by the methods described in our copending applications: Ser. No. 433,818 filed Feb. 18, 1965 and Ser. No 457,533 filed May 20, 1965.)

Typical syntheses of the compounds of the present invention are as follows:

(1) Starting with the allyl ether:

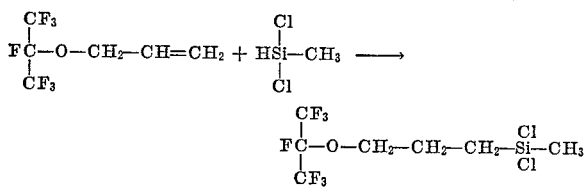

(2) Starting with the vinyl ether:

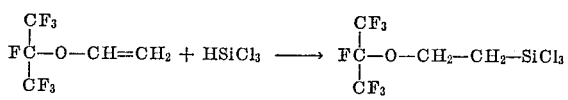

The process is by no means limited to the above examples. Generically, the allyl (or vinyl) ether may be any compound responding to the formula

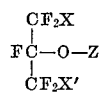

(wherein X and X' are as above defined and Z is an allyl or vinyl radical).

Illustrative examples of the ether reactant are as follows: heptafluoroisopropyl allyl ether, heptafluoroisopropyl vinyl ether, β-chlorohexafluoroisopropyl allyl ether, β-chlorohexafluoroisopropyl vinyl ether, β,β'-dichloropentafluoroisopropyl allyl ether, β,β'-dichloropentafluoroisopropyl vinyl ether, β-bromohexafluoroisopropyl allyl (or vinyl) ether, and the like.

The silane reactant may be any compound responding to the formula

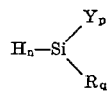

wherein Y, R, $n$, $p$, and $q$ are as above defined.

Illustrative examples of the silane reactant are: trichlorosilane; tribromosilane; dichlorosilane; dibromosilane; alkyldihalosilanes such as methyldichlorosilane, butyldichlorosilane, cyclohexyldichlorosilane, etc.; dialkylhalosilanes such as dimethylchlorosilane, diethylchlorosilane, and dicyclohexylchlorosilane; aryldihalosilanes and diarylhalosilanes such as phenyldichlorosilane and diphenylchlorosilane; aralkylhalosilanes such as benzyldichlorosilane and dibenzylchlorosilane; silanes containing halo-hydrocarbon substituents such as β-chloroethyldichlorosilane, 4 - chlorocyclohexyldichlorosilane, p-chlorophenyldichlorosilane, 3,3,3-trifluoropropyldichlorosilane, etc.; silanes containing alkoxy groups such as methyldiethoxysilane, i.e., $CH_3HSi(OC_2H_5)_2$, triethoxysilane, i.e., $HSi(OC_2H_5)_3$, diethoxysilane, i.e., $H_2Si(OC_2H_5)_2$, dicyclohexyloxysilane, phenyldiethoxysilane, and the like.

It is evident from the foregoing formulas that the synthesis involves a simple addition of the silane to the unsaturated group of the allyl (or vinyl) ether, the hydrogen of the silane adding to one carbon of the unsaturated pair, the remainder of the silane to the other carbon of said pair. This addition may be carried out over a wide range of temperatures, varying from room temperature to 450° C., and pressures ranging from ambient pressure to 100 or more atmospheres, using free-radical catalysts, such as benzoyl peroxide, t-butyl perbenzoate, azo-bis-isobutyronitrile; metals or metal salts such as platinum, palladium, ruthenium chloride, potassium chloroplatinate, or platinum on charcoal or asbestos; organic bases such as triethylamine, pyridine, or piperidine; acid catalysts such as chloroplatinic acid or boron trifluoride. In the alternative, the addition may be effected with U.V. initiation or simply by heating to high temperatures in the absence of a catalyst.

In a typical application, the addition is carried out by heating the reactants in the presence of a catalytic proportion of chloroplatinic acid and the addition product is isolated by distillation. Generally, the addition is carried out at a temperature of about 60 to 120° C. when a catalyst such as chloroplatinic acid is employed. The optimum temperature in any particular case will depend on the catalyst employed. For example, the addition can be conducted at room temperature with U.V. initiation. In the alternative, the addition may be conducted in the absence of any catalyst, at temperatures of 250–450° C. and under autogenous pressure in a sealed vessel such as an autoclave. The addition may be carried out in the presence of inert solvents such as carbon tetrachloride or benzene but these are not usually necessary.

In applying the addition reaction to silanes containing a single hydrogen attached to silicon, the allyl (or vinyl) ether and silane are generally employed in equimolar quantities. Where the silane contains more than one hydrogen attached to silicon, the proportions of reactants may be varied to yield mono-, di- or higher addition products. For example, in using a dihydrosilane equimolar proportions will yield mainly the mono-addition product. However, by using an excess of the allyl (or vinyl) ether—for example, from 2 to 4 moles thereof per mole of dihydrosilane—one can prepare the di-addition product, that is, the compound with one silane group and two perhaloisopropoxyalkyl groups.

Regarding the compounds of the invention wherein Y is alkoxy or aroxy, these may be prepared directly, for example, employing in the addition a hydrosilane containing an alkoxy or phenoxy group. Usually, however, it is preferred to apply the addition to a hydrosilane containing halogen (for instance, HSiCl₃ or CH₃HSiCl₂). The resulting addition product is then contacted with an anhydrous alcohol or phenol in the presence of an HCl-acceptor such as pyridine or dimethylaniline to yield the desired alkoxy or phenoxy derivative. A typical synthesis in this area is the conversion of 3-(heptafluoroisopropoxy)propyl trichlorosilane to the corresponding trimethoxy derivative:

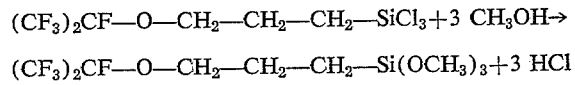

In some cases, these derivatives (e.g., alkoxides) are preferred over the corresponding chlorosilanes since they do not release HCl when contacted with substances containing active hydrogen (as in OH, NH₂ and like groups). Thus, in applications to various substrates, use of the alkoxides avoids any possibility of damage to the substrate.

USES OF THE COMPOUNDS

The compounds of the invention are generally useful as intermediates for various syntheses. Typically, the halosilane derivatives (for example, the compounds as formulated above wherein Y is chlorine) may be reacted: with alcohols or phenols to produce the corresponding alkoxides or phenoxides; with alkylamines to produce the corresponding silylamines; with anhydrides to produce the corresponding acyloxysilanes. In addition, the compounds of the invention are useful directly in treating fibrous substrates as explained in more detail below.

PREPARATION OF POLYMERS

The monomers of the invention containing 2 to 3 hydrolyzable groups (that is, where p is 2 or 3) are polymerizable and come into special consideration. These compounds—herein designated as di- and tri-functional monomers for simplicity of reference—can be formed into homopolymers or copolymers by standard hydrolytic polymerization techniques used with simple chlorosilanes and alkoxysilanes. Typically, the polymerization is effected by stirring the di- or tri-functional monomer with an excess of water. Linear polymers may be prepared by applying this polymerization to a single di-functional monomer or a mixture of different difunctional monomers. Thus, for instance, one may polymerize 3-(heptafluoroisopropoxy)propyl-methyldichlorosilane, or the corresponding dimethoxy derivative, to yield a linear polymer containing the following repeating unit:

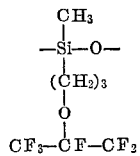

By applying the polymerization to a mixture of the aforesaid monomer and bis - (3 - (heptafluoroisopropoxy)propyl)-dichlorosilane one obtains a linear polymer which contains not only the repeating units sown in Formula II above but also the repeating unit:

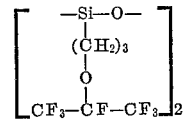

Generally, the linear polymers derived from the di-functional monomers of the invention are liquids, of a syrupy consistency, poorly soluble in common solvents such as benzene and toluene but readily soluble in fluorinated solvents such as benzotrifluoride, 1,3-bistrifluoromethyl benzene, or trichlorotrifluoroethane.

The monomers described herein may be copolymerized with known polymerizable silanes, as, for example, dimethyldichlorosilane, diphenyldichlorosilane, methyldichlorosilane, methyltrichlorosilane, methyl di-(or tri-) chlorosilane, methyltrichlorosilane, methyl di-(or tri-) ethoxysilane, trichlorosilane, vinyl trichlorosilane, methyl vinyl dichlorosilane, etc.

Among the preferred types of polymers are those containing hydrogen attached to silicon. These can be prepared in various ways. For example, a di-functional monomer where R is hydrogen may be polymerized by itself or with a different polymerizable silane. In the alternative, the Si—H group may be derived from the co-monomer. Thus, for example, a di-functional monomer where-in R is hydrocarbon may be copolymerized with a known polymerizable monomer containing an Si—H grouping, e.g., methyl dichlorosilane, butyldichlorosilane, phenyl dichlorosilane, methyldiethoxysilane, phenyldiethoxysilane, or the like. These polymers containing H bonded to Si have the advantage that when applied to a fibrous material—such as one of proteinous or cellulosic nature—and subjected to a conventional cure, there occurs an especially good bonding of the polymer to the substrate. The bonding not only occurs by reaction of terminal (unhydrolyzed) radicals in the polymers with reactive sites in the substrate but also by reactions of such sites with the reactive group presented by the hydrogen directly attached to Si. Beyond the use in application to substrates the polymers containing Si—H groupings can be formed into rubbery materials, useful, for example, in preparing solvent-resistant gaskets and sealing compositions. In preparing such rubbers, the polymer produced in the usual hydrolytic polymerization is heated, for example, at 100–200° C. in air with or without a peroxide catalyst whereby a cross-linking takes place, resulting in formation of a rubber, insoluble in common solvents but swellable in fluorinated solvents such as 1,3-bis-(trifluoromethyl)benzene.

Cross-linked polymers can be prepared by polymerizing the tri-functional monomers alone, or by co-polymerizing them with a different tri-functional monomer or one or more di-functional monomers. Typical in this area is the homopolymerization of 3-(heptafluoroisopropoxy)propyl trichlorosilane by stirring this monomer with an excess of water. The syrupy monomer which is obtained may then be further polymerized to yield a solid polymer by heating it in air at about 100–200° C. Another example is the copolymerization of 3 - (heptafluoroisopropoxy)propyl-methyl dichlorosilane and 3 - (heptafluoroisopropxy) propyl-trichlorosilane by dissolving these monomers in an inert solvent and stirring the solution with an excess of water. The syrupy liquid copolymer which is formed can then be cured to a rubbery polymer by heating in air at about 100–200° C.

Cross-linked polymers can also be prepared by copolymerizing the tri-functional monomers of the invention with known di- or tri-functional silanes such as dimethyldichlorosilane, methyl dichlorosilane, methyl trichlorosilane, vinyl trichlorosilane, trichlorosilane, or the like. Among the preferred copolymers in this area are those containing hydrogen attached to silicon. Such copolymers can be prepared, for example, by copolymerizing a tri-functional monomer, such as 3-(heptafluoroisopropoxy)propyltrichlorosilane, with trichlorosilane. As noted above, polymers containing hydrogen attached to silicon are among the preferred agents for treating fibrous materials. Moreover, cross-linked polymers can also be prepared from the di-functional monomers of th's invention with known trifunctional silanes such as trichlorosilane, trimethoxysilane, methyltrichlorosilane, phenyltrichlorosilane, or the like. These copolymers may be prepared by dissolving the appropriate monomers in an inert solvent and stirring the solution with an excess of water. The syrupy copolymer which is produced may then be further polymerized by heating in air at 100–200° C.

The polymers which may be produced from the di- and trifunctional monomers of the invention may vary in composition over a wide range. For instance, the polymers derived from one or more di-functional monomers will contain repeating units of the formula—

III 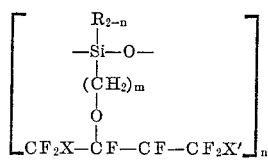

wherein X, X′, R, m, and n are as above defined.

At the opposite extreme the polymers derived from one or more of the trifunctional monomers will contain repeating units of the formula—

IV 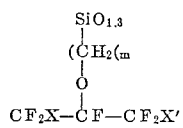

However, the invention also includes copolymers of the di- and trifunctional monomers so that, generically, the polymers ranging from those derifed from difunctional monomers, through those derived from mixtures of di- and trifunctional monomers, and including those derived from trifunctional monomers, may be considered as containing repeating units of the following average general formula:

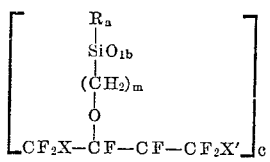

wherein
X, X′, R, and m are as above defined and
wherein
a has an average value from 0 to 1,
b has an average value from 1 to 1.5,
c has an average value from 1 to 2, and
the sum of $a+2b+c$ is 4.

In any of the polymerizations described above, the chain length of the polymer can be limited by adding to the polymerization mixture a mono-functional monomer, as, for example, 3 - (heptafluoroisopropoxy)propyl - dimethylchlorosilane, which acts as a chain-stopper.

TREATMENT OF FIBROUS SUBSTRATES

The compounds described herein are particularly useful for the treatment of fibrous materials, such as textiles, in order to improve their properties, e.g., to improve their oil-, water-, and soil-repellency. In practicing this phase of the invention, a polymer is prepared as described above and applied to the fibrous material. The polymer may be a homopolymer, that is, one consisting of recurring units of a di-functional monomer or a tri-functional monomer. Moreover, it may be a copolymer, that is, a polymer containing recurring units of one di-functional monomer or one tri-functional monomer interspersed with recurring units derived from one or more different di-functional monomers and/or one or more tri-functional monomers. The co-monomers may, for example, be known silanes such as methyldichlorosilane, dimethyldichlorosilane, methyltrichlorosilane, trichlorosilane, phenyldichlorosilane, and the like.

The polymers (homo- or co-polymers) are applied to the fibrous material in conventional manner. Typically, the polymer is dissolved in an inert volatile solvent, e.g., benzotrifluoride, 1,3-bis-trifluoromethyl benzene, or trichlorotrifluoroethane. The resulting solution is applied to the fibrous material by a conventional dip and pad technique. By varying the concentration of the polymer in solution and the degree of padding, the amount of polymer deposited on the material may be varied. Typically, the amount of polymer may be from 0.1 to 20%, based on the weight of fibrous material but it is obvious that higher or lower proportions can be used if desired. Usually, in treating textiles such as fabrics, the amount of polymer is limited to about 0.1 to 5% to attain the desired repellency without interference with the hand of the textile. In an alternative procedure, the polymers are applied to the fibrous material in the form of an aqueous emulsion.

After application of the polymer solution, the treated fibrous substrate is subjected to a conventional curing operation in order to bond the polymer to the fibers. As an example of such treatment, the fibrous material is heated in the range of about 50 to 150° C. for a period of 5 to 60 minutes. The solvent (from the polymer solution) may be evaporated in a separate step prior to curing or it may simply be evaporated during the curing operation. In this curing operation the uncondensed or unhydrolyzed groups in the uncured polymer (e.g., halo, alkoxy, or aroxy groups attached to Si) react with reactive sites in the fibers, particularly sites which contain active hydrogen as in hydroxyl, primary and sedondary amide, thiol, carboxyl, and like groups. Many types of fibers—for example: wool, silk, hair, and other proteinous fibers; cotton, rayons, and other cellulosic fibers; nylon, polyurethane, and polyurea fibers—contain groups of this kind and therefore are particularly suitable substrates to obtain good bonding of the polymer deposit. Moreover, virtually all fibrous materials, even inorganic products such as asbestos and glass fibers, contain moisture and during the curing operation this moisture promotes additional hydrolysis and condensation of unreacted Si-bonded halo, alkoxy, or aroxy groups with the end result that additional, in situ, polymerization occurs so that the polymer is durably fixed to the treated substrate.

If it is desired to expedite the curing operation, a conventional curing catalyst may be added to the polymer solution before application to the fibrous substrate or the catalyst may be separately deposited on the substrate before or after application of the polymer solution. Typically, one may use such catalysts as zinc octoate, dibutyltin diacetate or dilaurate, triethanolamine titanate, triethanolamine zirconate, zirconium acetate, zirconium oxychloride, zirconium or titanium esters of alkanols such as tetrabutyl titanate, zinc perfluorobutyrate, etc.

Fibrous materials treated with the polymers of the invention display an enhanced resistance to becoming soiled because they repel both water- and oil-borne soils and stains. Particularly important in conferring high resistance to soiling by oily materials is the fluorinated isopropyl moiety of the polymers, most importantly the fact that there is a fluorine in the alpha position (the secondary carbon atom). Another significant point is that the enhancement of soil repellency is attained without detriment to other properties of the textile. In particular, the treatment does not impair the hand of the textile. In fact, the hand is usually improved in that the textile is softer and more supple. Another point is that the improvements rendered by the process are durable—they are retained despite laundering and dry-cleaning of the product. Although the preformed polymers are usually applied to the fibrous material, the monomers may be applied as such in the form of a vapor, in the pure liquid form, or from solution in an inert volatile solvent. On application of the monomers to the fibrous material, reactions take place whereby the applied compound is bonded to the fibers. This bonding is believed to occur through reaction of the reactive groups of the monomer (Y in Formula I, above) with reactive sites in the fibers, particularly sites which contain active hydrogen as in OH, $NH_2$—, —NH—, and similar groups. It is also believed that concomitantly, polymerization of the monomer occurs in situ on the fibers, such polymerization being promoted by the moisture naturally present in all fibrous materials. To promote the bonding of the monomer and the in situ polymerization thereof, it is preferred to cure the treated fibrous substrate, for example at 50–150° C. for 5 to 60 min.—after application of the monomer. To expedite the curing operation, one may add a conventional curing catalyst such as those listed above.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg, albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

EXAMPLES

The invention is further demonstrated by the following illustrative examples. The various tests described in the examples were carried out as described below:

Oil repellency: The 3M repellency test described by Grajack and Petersen, Textile Research Journal, 32, pp. 320–331, 1962. Ratings are from 0 to 150, with the higher values signifying the greater resistance to oil penetration.

Water repellency: AATC spray test, method 22–1952. Ratings are from 0 to 100, with the higher values signifying greater resistance to water penetration.

Example 1.—Preparation of 3-(heptafluoroisopropoxy) propylmethyldichlorosilane

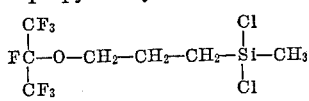

A heavy-walled Pyrex tube, sealed at one end, was dried and charged with 0.035 mole of heptafluoroisopropyl allyl ether, 0.035 mole of methyldichlorosilane, and 0.15 ml. of a 0.14 molar solution of $H_2PtCl_6 \cdot 6H_2O$ in isopropanol. The tube was cooled under nitrogen, evacuated, and melt-sealed. This procedure was repeated until five tubes had been thus prepared. The tubes were placed in a steel cylinder and heated at 80–100° C. for 6 hours. After cooling, the contents of the tubes were combined and distilled. The product (40 g., 71% yield) was obtained as a clear liquid, B.P. 43–45° C. at 1–2 mm. Hg, density at 22° C. 1.4 g./ml., $N_D^{22}$ 1.3652. The proton NMR and IR spectra were in accord with the structure given above.

Analysis calculated for $C_7F_7H_9SiCl_2O$.—C, 24.64; F, 38.91; H, 2.63. Found: C, 25.07; F, 39.05; H, 2.77.

Example 2.—Preparation of 3-(β-chlorohexafluoroisopropoxy)-propyl-methyldichlorosilane

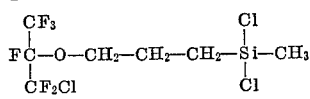

Addition of β-chlorohexafluoroisopropyl allyl ether to methyldichlorosilane, using a chloroplatinic acid catalyst, was carried out in sealed tubes at 80–100° C. as described in Example 1, using 0.06 mole of β-chlorohexafluoroisopropyl allyl ether, 0.06 mole of methyldichlorosilane, and 0.25 ml. of a 0.14 molar solution of $H_2PtCl_6 \cdot 6H_2O$ in isopropanol. An 80% yield of the product was obtained—B.P. 58–59° C. at 1 mm. Hg, $N_D^{24}$ 1.3906.

Example 3.—Preparation of 3-(β,β-dichloropentafluoro-isopropoxy)propylmethyldichlorosilane

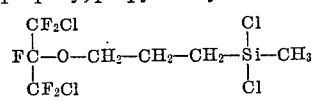

Addition of β,β'-dichloropentafluoroisopropyl allyl ether to methyldichlorosilane was carried out as described in Example 1, using 0.09 mole of β,β'-dichloropentafluoroisopropyl allyl ether, 0.09 mole of methyldichlorosilane, and 0.5 ml. of a 0.14 molar solution of $H_2PtCl_6 \cdot 6H_2O$ in isopropanol. An 82% yield of the product was obtained—B.P. 67–68° C. at 0.25 mm. Hg, $N_D^{23}$ 1.4097.

Analysis calculated for $C_7F_5H_9SiCl_2O$.—C, 22.48; F, 25.40; H, 2.43; Si, 7.5; Cl, 37.9. Found: C, 22.59; F, 25.86; H, 2.46; Si, 6.75; Cl, 36.58

Example 4

The same product as obtained in Example 1 was prepared in 25% yield by heating the following ingredients in a sealed tube at 90° C. for 10 hours: 0.02 mole heptafluoroisopropyl allyl ether, 0.02 mole methyldichlorosilane, 0.002 mole t-butyl perbenzoate.

Example 5.—Preparation of 3-(heptafluoroisopropoxy) propyl-trichlorosilane

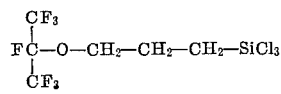

The compound was prepared by heating the following ingredients in a sealed tube at 90° C. for 6 hours: 0.06 mole heptafluoroisopropyl allyl ether, 0.06 mole trichlorosilane, 0.2 ml. of 0.14 molar $H_2PtCl_6 \cdot 6H_2O$ in isopropanol. An 85% yield of the product was obtained—B.P. 39° C. at 0.5 mm. Hg.

Analysis calculated for $C_6F_7H_6SiCl_3O$.—C, 19.93; H, 1.66. Found: C, 19.50; H, 1.69.

Example 6.—Preparation of 3-(β-chlorohexafluoroisopropoxy)propyl-tricholrosilane

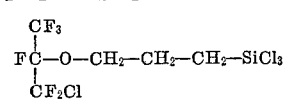

The compound was prepared by heating the following ingredients in a sealed tube at 90° C. for 6 hours:

β-Chlorohexafluoroisopropyl allyl ether ___moles__ 0.09
Tirchlorosilane _____do____ 0.09
0.14 molar $H_2PtCl_6 \cdot 6H_2O$ in isopropanol ____ml__ 0.25

The product was obtained in 60% yield—B.P. 54° C. at 0.5–1 mm. Hg.

Example 7.—Preparation of 3-(heptafluoroisopropoxy) propyl-diphenylchlorosilane

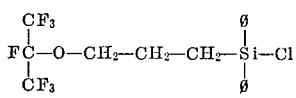

The compound was prepared by heating the following ingredients in a sealed tube at 90° C. for 6 hours:

Heptafluorosiopropyl allyl ether _____moles__ 0.09
Diphenylchlorosilane _____do____ 0.09
0.14 molar H$_2$PtCl$_6$·6H$_2$O in isopropanol ____ml__ 0.3

The porduct was obtained—B.P. 110° C. at 1.5 mm. Hg; N$_D^{23}$ 1.5383.

Example 8.—Preparation of 2(heptafluoroisopropoxy) ethyl-methyldichlorosilane

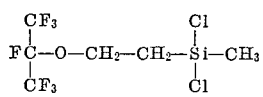

The compound was prepared by heating the following ingredients in a sealed tube at 90° C. for 6 hours:

|  | Ml. |
|---|---|
| Heptafluoroisopropyl vinyl ether | 2.5 |
| Methyldichlorosilane | 2 |
| 0.14 molar solution of H$_2$PtCl$_6$·6H$_2$O in isopropanol | 0.06 |

A 73% yield of product was obtained—B.P. 55° C. at 20 mm. Hg.

Analysis calculated for C$_6$F$_7$H$_7$SiCl$_2$O.—C, 22.03; F, 40.6; H, 2.16; Si, 8.59. Found: C, 21.07; H, 2.31; F, 39.75; Si, 8.98.

Example 9.—Preparation of 2-(β-chlorohexafluoroisopropoxy)ethyl-methyldichlorosilane

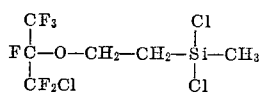

The compound was prepared by heating the following ingredients in a sealed tube at 90° C. for 6 hours:

β-Chlorohexafluoroisopropyl vinyl ether __moles___ 0.03
Methyldichlorosilane _____do____ 0.03
0.14 molar solution of H$_2$PtCl$_6$·6H$_2$O in isopropanol _____ml__ 0.12

A 75% yield of product was obtained—B.P. 70° C. at 20 mm. Hg.

Example 10.—Preparation of 2-(heptafluoroisopropyl) ethyl-trichlorosilane

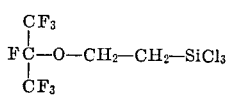

The compound was prepared by heating the following ingredients in a sealed tube at 90° C. for 6 hours:

Heptaflouroisopropyl vinyl ether _____moles__ 0.01
Trichlorosilane _____do____ 0.01
0.14 molar solution of H$_2$PtCl$_6$·6H$_2$O in isopropanol _____ml____ 0.05

An 84% yield of the product was obtained—B.P. 50° C. at 20 mm. Hg.

Example 11.—Preparation of bis[3-(heptafluoroisopropoxy)propyl]-dichlorosilane

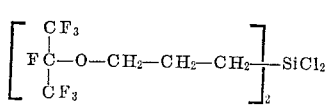

The compound was prepared as described in Example 1, using the following ingredients:

Heptaflouroisopropyl allyl ether _____moles__ 0.03
Dichlorosilane _____do____ 0.01
0.14 molar solution of H$_2$PtCl$_6$·6H$_2$O in isopropanol _____ml__ 0.12

After recovering unreacted allyl ether and ca. 10% of a lower boiling fraction believed to be the mono-addition product,

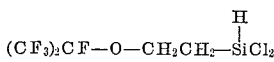

the desired diadduct was obtained—B.P. 140° C. at 0.52–2 mm. Hg.

Example 12.—Polymerization of 3-(heptafluoroisopropoxy)propyl-methyldichlorosilane The dichlorosilane, prepared as described in Example 1, was polymerized in the following manner: A 3-ml. sample of the dichlorosilane was added dropwise to 10 ml. water with vigorous stirring. After the addition, stirring was continued for 30 minutes. Water was removed and the polymeric siloxane, containing a repeating unit of the structure:

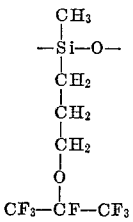

was washed several times with water to remove residual HCl. The polysiloxane was a thick, but pourable, liquid which was not readily soluble in toluene but could be easily dissolved in trichlorotrifluoroethane.

Example 13.—Polymerization of 3-(heptafluoroisopropoxy)propyl-trichlorosilane (a) The trichlorosilane, prepared as described in Example 5, was polymerized by addition to an excess of water as described in Example 12. The polymeric siloxane was a thick, gummy mass which flowed very slowly at room temperature. It was insoluble in acetone and toluene but soluble in trichlorotrifluoroethane and 1,3-bis-(trifluoromethyl)benzene.

(b) A portion of the polysiloxane was placed in an open vial in an oven held at 150° C. for 24 hours. At the end of this heating period, the gummy material had been converted into a highly cross-linked clear, rubbery solid which was insoluble and did not appear to swell in toluene or heptane. It was also insoluble in trichlorotrifluoroethane. The polymer did not undergo visible charring or gas evolution on heating to 350° C. in air.

Example 14.—Copolymerization of methyldichlorosilane and 2 - (heptafluoroisopropoxy)propyl-methyldichlorosilane (a) A mixture of 1 ml. of methyldichlorosilane and 3 ml. of 2-(heptafluoroisopropoxy)propyl-methyldichlorosilane was added slowly to 15 ml. of water with stirring. After the addition, the mixture was stirred an additional 30 minutes and the water removed by decantation. The siloxane polymer was then washed several times with water to remove residual HCl. A thick liquid polymer was obtained which had limited solubility in toluene, heptane, and acetone.

(b) The linear polysiloxane was cured to a highly cross-linked rubber by either heating with a peroxide catalyst or simply heating in an open vessel. For example, a 1-gram sample of the liquid polymer was heated in an open vial in an oven at 150° C. for 48 hours. At the end of this time, the resulting polymer was a clear, rubbery material which would not dissolve or swell in toluene, acetone, or heptane but appeared to swell slightly in fluorinated solvent such as 1,3-bis-(trifluoromethyl)benzene. The polymer was heated in an open test tube to 360° C. There were no obvious signs of degradation; the polymer remained a clear, rubbery solid after this heat treatment.

*Analysis.*—Found: C, 26.85; H, 2.97; F, 45.92; Si, 11.68.

Example 15.—Preparation and polymerization of 3-(heptafluoroisopropoxy)propyl-trimethoxysilane Ten grams of the trichlorosilane obtained in Example 5 were added slowly to a 20% excess of methanol. Dry nitrogen was bubbled through the mixture during the addition to remove HCl. The excess methanol was removed by distillation and the trimethoxy derivative—

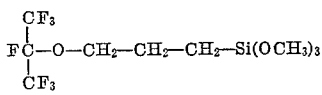

was obtained in a yield of 90%, B.P. 39° C. at 0.5 mm. Hg, $N_D^{22}$ 1.3481.

Analysis calculated for $C_9F_7H_{15}SiO_4$.—C, 31.03; F, 37.06; H, 4.3; Si, 8.04. Found: C, 31.48; F, 38.38; H, 4.23; Si, 8.00.

Polymerization of the trimethoxy derivative was carried out by hydrolysis as described in Example 13. The thick, viscous polymer so obtained was cured to an insoluble, clear rubber by heating in an open vessel at 150° C. for 10 hours.

Example 16.—Preparation and polymerization of 3-(heptafluoroisopropoxy)propyl-methyldiethoxysilane The dichlorosilane obtained in Example 1 was converted into the diethoxysilane by addition to an excess of anhydrous ethanol. The compound had a B.P. of 93° C. at 1–2 mm. Hg.

Polymerization of the diethoxysilane was effected in the manner as described in Example 12, i.e., stirring into water. The polymer was a thick liquid, not readily soluble in toluene, soluble in trichlorotrifluoroethane.

Example 17.—Copolymerization of 3-(β-chlorohexafluoroisopropoxy)propyl-methyldichlorosilane and 2-(heptafluoroisopropoxy)propyl-trichlorosilane A mixture of 3 ml. each of the dichloro- and trichlorosilanes was dissolved in 20 ml. diethyl ether. A saturated solution of water in 30 ml. of diethyl ether was then added with stirring. After the addition, 10 ml. more water were added and the mixture stirred vigorously for one hour. The mixture displayed three phases—precipitated polymer, an ether phase, and a water phase. The last was removed and discarded. The ether phase was separated, washed with water, the ether evaporated, and the residual polysiloxane added to the precipitated portion. The polysiloxane was a thick, syrupy liquid. It cured to an insoluble rubbery solid by heating in air at 150° C. for 48 hours.

Example 18.—Application of 2-(heptafluoroisopropoxy)ethyl-methyldichlorosilane to textiles A 5% solution of the dichlorosilane (synthesis shown in Example 8) in toluene was prepared. Swatches of cotton fabric were immersed for 10 minutes in the solution held at 80° C. The swatches were then removed from the solution, rinsed twice with acetone to remove unreacted dichlorosilane, and cured in an oven at 150° C. for 5 minutes.

The treated fabric exhibited a water-repellency rating of 100 and an oil-repellency rating of 50. The corresponding characteristics of the untreated fabric were both zero.

Example 19.—Application of 3-(heptafluoroisopropoxy)propyl-trichlorosilane to textiles A 50% solution of the trichlorosilane (synthesis shown in Example 5) in toluene was prepared. Fabric swatches of wool and cotton were placed in the solution, and held therein for 10 minutes at 80° C. The swatches were then removed from the solution, rinsed twice with acetone to remove unreacted trichlorosilane, dried in air, and cured at 150° C. for 10 min. Tests on the fabrics before and after the treatment gave the following results:

| Fabric | Oil repellency rating | Water repellency rating |
|---|---|---|
| Cotton, treated | 90 | 100 |
| Cotton, untreated | 0 | 0 |
| Wool, treated | 80 | 100 |
| Wool, untreated | 0 | 50 |

Example 20.—Application of 3-(heptafluoroisopropoxy)propyl-trimethoxysilane to fabrics Cotton and wool swatches were immersed in a 5% solution of 3-(heptafluoroisopropoxy)propyl-trimethoxysilane dissolved in absolute ethanol, then squeezed to obtain an approximate 100% wet pick-up. The swatches were then cured and tested in the following manner:

PROCEDURE A

Treated swatches were air-dried 20 minutes, then pressed in a Hoffman steam press (about 150° C.) for 2 minutes, then washed with methanol and dried before testing.

PROCEDURE B

Treated swatches were simply allowed to dry at room temperature overnight and then tested for oil and water repellency.

| Material | Oil repellency | Water repellency |
|---|---|---|
| Procedure A: | | |
| Wool | 70–80 | 100 |
| Cotton | 70–80 | 90 |
| Procedure B: | | |
| Wool | 90–100 | 100 |
| Cotton | 70–80 | 90 |
| Untreated wool | 0 | 50–60 |
| Untreated cotton | 0 | 0 |

Example 21.—Examination of the liquid-solid contact angles of glass coated with several chlorosilanes Three solutions were prepared in toluene of the agents listed below, in each case at a concentration of 2.5%:

Solution A: dimethyldichlorosilane
Solution B: 3-(heptafluoroisopropoxy)propyl-methyldichlorosilane
Solution C: 3-(heptafluoroisopropoxy)propyl-trichlorosilane.

Glass slides were held in each of the solutions for 10 seconds, then withdrawn vertically and shaken to remove any adhering droplets. The slides were then placed in an oven at 150° C. for 10 min.

After cooling to room temperature, contact angle measurements were made of droplets of pure hexadecane on the treated slides. The contact angle is an inverse measure of the wettability of a surface, e.g., the larger the angle the less wettable is the surface. The results are tabulated below:

| Solution | Compound applied | Contact angle,[1] degrees |
|---|---|---|
| A | Dimethyldichlorosilane | 36.0 |
| B | 3-(heptafluoroisopropoxy)propyl-methyldichlorosilane. | 49.7 |
| C | 3-(heptafluoroisopropoxy)propyl-trichlorosilane. | 61.2 |

[1] Average of 3 to 5 measurements.

The results indicate that 3-(heptafluoroisopropoxy)propyl-trichlorosilane produced the least wettable surface whereas the known compound, dimethyldichlorosilane, produced the most wettable.

It is of interest to note that a drop of hexadecane placed on an untreated glass slide will not form a distinct drop but will spread out in a continuous film, i.e., the contact angle is zero or expressed in other words, the surface is wetted by this liquid.

Example 22.—Application of polymer derived from 3-(heptafluoroisopropoxy)propyl-trichlorosilane to wool The polymeric gummy siloxane prepared by hydrolysis as illustrated in Example 13, part a, was dissolved in trichlorotrifluoroethane (4% solution). Swatches of wool fabric were immersed in the solution, removed and air dried, then cured at 150° C. for 30 min.

Tests on the treated and untreated fabric are tabulated below:

| Fabric | Oil repellency | Water repellency |
|---|---|---|
| Treated | 80 | 100 |
| Untreated | 0 | 50 |

It was also observed that the hand of the treated fabric was softer and more luxurious than that of the untreated fabric.

Example 23.—Application of a copolymer derived from 2-(heptafluoroisopropoxy)ethyl - methyldichlorosilane and methyldichlorosilane to wool The liquid copolymer prepared according to Example 14, part a, was dissolved (4%) in trichlorotrifluoroethane and applied to wool fabric. The fabric was air dried, then cured at 150° C. for 10 min. The fabric had a water-repellency rating of 100 (untreated, 50) and had a hand superior to that of the untreated fabric.

Example 24

(A) PREPARATION OF HOMOPOLYMER 3-(heptafluoroisopropoxy)propyltrichlorosilane

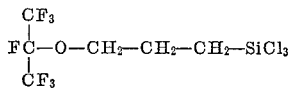

was prepared as described in Example 5. It was then polymerized, using the following technique:

Twenty ml. of the aforesaid monomer was added slowly to 600 ml. of water with vigorous stirring. After the addition, the mixture was stirred an additional 20 minutes, and the water was decanted from the polysiloxane which had settled as a precipitate. The polysiloxane was dissolved in 50 ml. of trichlorotrifluoroethane and the solution washed three times with fresh portions of water. Solvent was then removed from the polymer solution in a vacuum oven and the residual polysiloxane was held in an oven at 140–150° C. for 15 hours to complete the polymerization.

The polysiloxane so formed contained repeating units of the structure

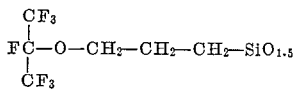

Analysis for $C_6F_7H_6O_{2.5}$.—Calculated: 47.6% F. Found: 45.1% F.

(B) APPLICATION OF HOMOPOLYMER TO FABRICS

A solution was made of the polysiloxane, in trichlorotrifluoroethane, at a concentration of 2% by weight. The solution was applied to samples of fabrics, namely, undyed wool flannel, dyed (brown) worsted wool, and undyed cotton. The application in each case was as follows:

The fabric swatch was immersed in the polymer solution, removed and squeezed in a hand wringer to about 100% wet pick-up, air-dried 5 minutes, and then cured in an oven at 130–140° C. for 10 minutes. The pick-up of the polysiloxane was 2% by weight.

(C) TESTS FOR OIL-REPELLENCY (HOMOPOLYMER)

The treated fabric samples—about 30 minutes after they had been removed from the curing oven—and samples of the untreated fabrics were tested for oil-repellency in the following manner:

Test No. 1.—Drops of white mineral oil were placed on the fabrics and the time for the drops to soak into the fabric was noted.

Test No. 2.—This test was the same as above, except that the test liquid was an S.A.E. 20 lubricating oil, which is, of course, less viscous, hence more penetrating than the mineral oil.

The results obtained are tabulated below:

| Fabric | Time for drop to soak into fabric | |
|---|---|---|
| | Mineral oil | Lube oil |
| Wool flannel: | | |
| Treated (hr.) | [1]>2,160 | [1]>2,160 |
| Untreated (min.) | <1 | <1 |
| Worsted: | | |
| Treated (hr.) | >2,160 | >2,160 |
| Untreated (min.) | <1 | <1 |
| Cotton: | | |
| Treated (hr.) | 1,440 | 600 |
| Untreated (min.) | <1 | <1 |

[1] Even after 2,160 hours (90 days), there was no indication that the oil had begun to penetrate into the fabric.

Example 25

(A) PREPARATION OF CO-POLYMER

A mixture of 20 ml. of 3-(heptafluoroisopropoxy)propyltrichlorosilane

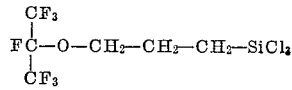

and 3 ml. of trichlorosilane (these amounts being equivalent to a molar ratio of 2.4/1) was poured into one liter of water with vigorous agitation. The copolymer which formed was separated from the water, dissolved in trichlorotrifluoroethane, and the solution washed three times with fresh portions of water. Solvent was then removed from the polymer solution in a vacuum oven. Analysis of the polysiloxane copolymer was carried out.

Based on the repeating structure

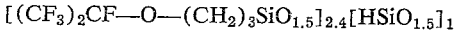

the calculated fluorine content is 44.2%. Found: 44.7% F.

(B) APPLICATION OF CO-POLYMER TO FABRIC

Solutions were made of the polysiloxane copolymer, in trichlorotrifluoroethane, at concentrations of 1% and 2% by weight.

These solutions were applied to a fabric (50/50 blend of cotton and wool) in exactly the same manner as described above in connection with the polysiloxane homopolymer in Example 24.

(C) TESTS FOR OIL REPELLENCY (CO-POLYMER)

The treated fabrics—about 30 minutes after having beent removed from the curing oven—were tested as described above in connection with the polysiloxane homopolymer in Example 24. The results are tabulated below:

| Fabric | Time for drop to soak into fabric | |
|---|---|---|
| | Mineral oil | Lube oil |
| Cotton/wool+2% copolymer (hr.) | 308 | 84 |
| Cotton/wool+1% copolymer (hr.) | 300 | 62 |
| Cotton/wool (untreated) (min.) | 1 | 1 |

PREPARATION OF STARTING COMPOUNDS

As noted above, the preparation of the allyl (or vinyl) ethers used as starting materials in the present synthesis are described in our prior applications 433,818 filed Feb. 18, 1965 and 457,533 filed May 20, 1965. To provide an independent disclosure, the following examples of the syntheses are included herein. The expression "diglyme" used below is an abbreviation for the dimethyl ether of diethylene glycol.

Example A.—Preparation of β,β'-dichloropentafluoroisopropyl allyl ether

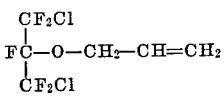

A dry, 250-ml., three-neck flask was fitted with a Dry Ice reflux condenser, gas-inlet tube, and magnetic stirring bar. Sixteen and eight-tenths grams (0.30 mole) dry potassium fluoride was placed in the flask, followed by 100 cc. diglyme. This dispersion was cooled to minus 40° C. by applying a Dry Ice cooling bath to the flask. Sixty grams (0.30 mole) of sym-dichlorotetrafluoroacetone was introduced into the flask. The cooling bath was then removed and the system allowed to come to room temperature. As the system warmed, formation of the fluorocarbinolate

was evidenced by the disappearance of the dispersed KF, giving a homogeneous solution.

Then, 36 grams (0.30 mole) allyl bromide was added in one batch. The Dry Ice condenser was replaced with a water condenser and the reaction mixture was heated for 10 hours at 80–90° C. The solid precipitate of potassium bromide was then removed by filtration and the filtrate poured into 250 cc. of cold water. The lower (fluorocarbon) layer was removed and washed three times with 50-cc. portions of water. Forty grams of crude product was obtained. This product was purified by fractional distillation, yielding 20 grams of pure allyl ether, B.P. 130° C. at 760 mm.

Example B.—Preparation of β-chlorohexafluoroisopropyl allyl ether

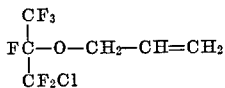

Using the procedure described in Example A, the following materials were applied to the reaction:

Potassium fluoride _____ g-- 41
Diglyme (solvent) _____ cc-- 90
Monochloropentafluoroacetone _____ g-- 41
Allyl bromide _____ g-- 28

Forty grams of crude product was obtained which was distilled to yield the pure allyl ether, B.P. 97° C. at 760 mm.

Example C.—Preparation of heptafluoroisopropyl allyl ether

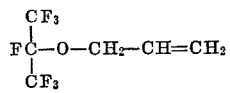

Using the procedure described in Example A, the following materials were applied to the reaction:

Potassium fluoride _____ g-- 15.3
Diglyme (solvent) _____ cc-- 90
Hexafluoroacetone _____ g-- 44
Allyl bromide _____ g-- 32

The allyl ether was obtained in a yield of 68%, B.P. 61° C. at 760 mm.

Example D.—Preparation of heptafluoroisopropyl vinyl ether

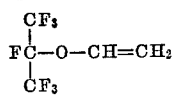

A dry, 500-ml., three-neck flask was equipped with stirring bar and Dry Ice reflux condenser and then charged with 31.8 g. KF (0.54 mole) and 250 ml. diglyme (the dimethyl ether of diethylene glycol). The flask was then cooled in a Dry Ice acetone bath and 90 g. (0.54 mole) hexafluoroacetone introduced. The contents of the flask was stirred and allowed to come to room temperature as the formation of potassium heptafluoroisopropyl alcoholate took place. After approximately one hour the alcoholate formation was complete, as evidenced by the disappearance of dispersed KF, and a clear solution was obtained. One-hundred and fifty grams (0.8 mole) of 1,2-dibromoethane was then added, in one batch, to the contents of the flask. The Dry Ice condenser was replaced with a water-cooled condenser and the flask was heated at 75° C. for 6 hours. As the reaction progressed, KBr precipitated out of solution. The reaction mixture was poured into 3 volumes of cold water and the lower fluorocarbon layer collected. This fluorocarbon layer (169 g.) was washed twice with water and dried. It was analyzed with a gas chromatographic unit and found to contain ca. 33% of the desired mono-addition product and approximately 8% of the di-addition product and unreacted starting material. The mono-addition product, 1-bromo-2-heptafluoroisopropoxyethane-

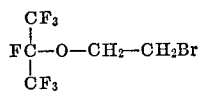

was separated by fractional distillation 30% yield, B.P. 103° C. at 760 mm.; $N_D^{23}$ 1.3360.

In a 3-neck, 100-ml., dry, round-bottom flask, equipped with a condenser, stirring bar, and thermometer, was placed 30 ml. methanol and 15 g. KOH. The mixture was stirred and heated to 90–100° C. Then 10 g. of 1-bromo-2-heptafluoroisopropoxyethane was added over a period of 15 minutes. During the addition, the condenser water was shut off and the condenser was allowed to warm to 40–50° C. to allow for removal of product. The mixture was heated an additional 20 minutes after the addition of the bromo-fluoro-ethane had been completed. The product (6.8 g.) was collected in a Dry Ice trap which was connected to the outlet of the condenser. Distillation of the crude product gave 4 g. of pure vinyl ether, B.P. 29° C. at 760 mm.

Example E.—Preparation of β,β'-dichloropentafluoroisopropyl vinyl ether

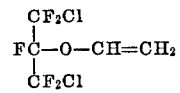

1-bromo - 2 - (β,β' - dichloropentafluoroisopropoxy) ethane was prepared in a manner similar to that described in Example D, using equimolar quantities of 1,2-dibromoethane, potassium fluoride, sym-dichlorotetrafluoroacetone, (i.e., ClF₂C—CO—CF₂Cl), and diglyme as a solvent. Gas chromatographic analysis of the crude product indicated a 60% conversion to the desired 1-bromo-2-(β,β'-dichloropentafluoroisopropoxy)ethane-

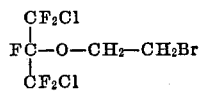

The crude mixture was added dropwise to a hot (100–110° C.) solution of KOH in ethanol (approximately 0.5 g. KOH/ml. ethanol) and the vinyl ether product distilled from the flask during the course of the addition. The product was poured into an equal volume of water in order to remove ethanol. The fluorocarbon layer was dried and distilled, yielding the desired vinyl ether: B.P. 81° C. at 760 mm.; $N_D^{23}$ 1.3579.

Example F.—Preparation of β-chlorohexafluoroisopropyl vinyl ether

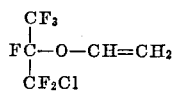

1-chloro-2-(β-chlorohexafluoroisopropoxy)ethane was prepared in a manner similar to that described in Example D, using equimolar quantities of 1-bromo-2-chloroethane, monochloropentafluoroacetone, KF, and diglyme as solvent. The crude product was dehydrochlorinated directly without preliminary purification, using hot alcoholic KOH as described in Example E. The vinyl ether was purified by distillation, B.P. 53–55° C.

It is evident from the above examples that other allyl or vinyl ethers can be prepared by appropriate selection of the ketone starting compound.

Having thus described the invention, what is claimed is:

1. As an article of manufacture, a fibrous substrate carrying a repellency-enhancing amount of a deposit of a compound of the structure:

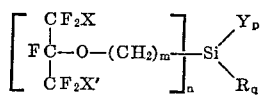

wherein:
X and X' are each halogen,
Y is a member of the group consisting of halogen, alkoxy, and aroxy,
R is a member of the group consisting of hydrogen, monovalent hydrocarbon radicals, and monovalent halo-hydrocarbon radicals,
$m$ is an integer from 2 to 3,
$n$ is an integer from 1 to 2,
$p$ is an integer from 1 to 3,
$q$ is an integer from 0 to 2, and
the sum of $n$, $p$, and $q$ is 4.

2. The article of claim 1 wherein:
X and X' are each F,
Y is Cl,
R is alkyl,
$n$ is 1,
$p$ is 2, and
$q$ is 1.

3. The article of claim 1 wherein:
X and X' are each F,
Y is Cl,
$n$ is 1,
$p$ is 3, and
$q$ is zero.

4. The article of claim 1 wherein:
X and X' are each F,
Y is Cl,
$n$ is 2,
$p$ is 2, and
$q$ is zero.

5. The article of claim 1 wherein:
X and X' are each F,
Y is Cl,
R is H,
$n$ is 1,
$p$ is 2, and
$q$ is 1.

6. The article of claim 1 wherein:
X and X' are each F,
Y is alkoxy,
$n$ is 1,
$p$ is 3, and
$q$ is zero.

7. As an article of manufacture, a fibrous substrate carrying a repellency enhancing amount of a deposit of a siloxane polymer which contains recurring units of the average formula:

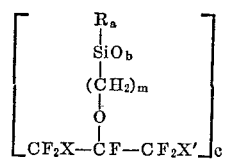

wherein:
X and X' are each halogen,
R is a member of the group consisting of hydrogen, monovalent hydrocarbon radicals, and monovalent halo-hydrocarbon radicals,
$m$ is a number from 2 to 3,
$a$ is a number from 0 to 1,
$b$ is a number from 1 to 1.5,
$c$ is a number from 1 to 2, and
the sum of $a+2b+c$ is 4.

8. As an article of manufacture, a fibrous substrate carrying a repellency enhancing amount of a deposit of a siloxane polymer which contains recurring units of the formula:

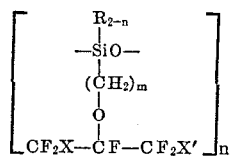

wherein:
X and X' are each halogen,
R is a member of the group consisting of hydrogen, monovalent hydrocarbon radicals, and monovalent halo-hydrocarbon radicals,
$m$ is an integer from 2 to 3, and
$n$ is an integer from 1 to 2.

9. The article of claim 8 wherein:
X and X' are each F,
R is alkyl, and
$n$ is 1.

10. The article of claim 8 wherein:
X and X' are each F,
R is H, and
$n$ is 1.

11. The article of claim 8 wherein:
X and X' are each F, and
$n$ is 2.

12. As an article of manufacture, a fibrous substrate carrying a repellency enhancing amount of a deposit of a siloxane polymer which contains recurring units of the formula:

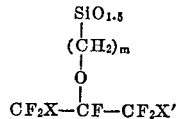

wherein:
X and X' are each halogen, and
$m$ is an integer from 2 to 3.

13. The article of claim 12 wherein X and X' are each fluorine.

14. The article of claim 12 wherein X and X' are each fluorine and the siloxane polymer additionally contains recurring units of the formula $$HSiO_{1.5}$$

15. The article of claim 12 wherein X and X' are each fluorine, and $m$ is 3.

16. The article of claim 12 wherein X and X' are each fluorine, $m$ is 3, and the siloxane polymer additionally contains recurring units of the formula $$HSiO_{1.5}$$

References Cited

UNITED STATES PATENTS 3,012,006  12/1961  Holbrook et al. ____ 117—121 X
3,015,585  1/1962  Holbrook et al. _____ 117—161

WILLIAM D. MARTIN, *Primary Examiner.*

T. G. DAVIS, *Assistant Examiner.*

U.S. Cl. X.R.

117—135.5, 138.8, 141, 143, 145, 155

PO-1050
(5/69)

UNITED STATES PATENT OFFICE
CERTIFICATE OF CORRECTION

Patent No. 3,441,431          Dated Apr. 29, 1969

Inventor(s)     Allen G. Pittman et al.

It is certified that error appears in the above-identified patent and that said Letters Patent are hereby corrected as shown below:

The formulas herein identified by column and line number (or formula number) should appear as shown below instead of as shown in the patent:

Column 6, line 5:      II.

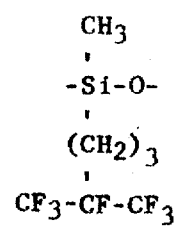

Column 6, lines 15-20:

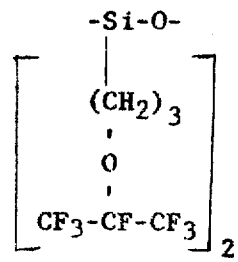

Column 7, lines 30-35, formula III:

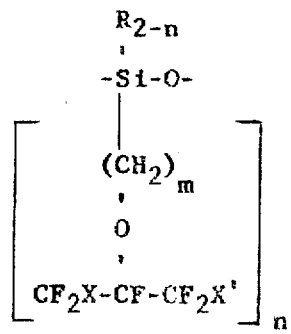

3,441,431
(2)

Column 7, line 45, formula IV:

$$\begin{array}{c} SiO_{1.5} \\ | \\ (CH_2)_m \\ | \\ O \\ | \\ CF_2X-CF-CF_2X' \end{array}$$

Column 7, line 60:

$$\begin{array}{c} R_a \\ | \\ SiO_b \\ | \\ \left[\begin{array}{c} (CH_2)_m \\ | \\ O \\ | \\ CF_2X-CF-CF_2X' \end{array}\right]_c \end{array}$$

Column 20, line 5:

$$\begin{array}{c} R_a \\ | \\ SiO_b \\ | \\ \left[\begin{array}{c} (CH_2)_m \\ | \\ O \\ | \\ CF_2X-CF-CF_2X' \end{array}\right]_c \end{array}$$

Column 20, line 30:

$$\begin{array}{c} R_{2-n} \\ | \\ -Si-O- \\ | \\ \left[\begin{array}{c} (CH_2)_m \\ | \\ O \\ | \\ CF_2X-CF-CF_2X' \end{array}\right]_n \end{array}$$

SIGNED AND
SEALED
MAR 24 1970

(SEAL)
Attest:

Edward M. Fletcher, Jr.
Attesting Officer

WILLIAM E. SCHUYLER, JR.
Commissioner of Patents